INVENTORS.
Herbert L. Kahn
BY Charles J. Chedester

Daniel R Levinson
ATTORNEY.

Dec. 2, 1969  H. L. KAHN ET AL  3,482,115
CIRCUITS FOR MEASURING THE LOGARITHM OF THE RATIO
OF TWO QUANTITIES
Filed Feb. 25, 1966  2 Sheets-Sheet 2
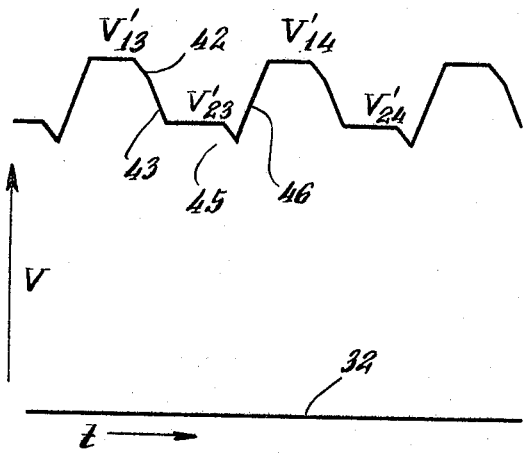
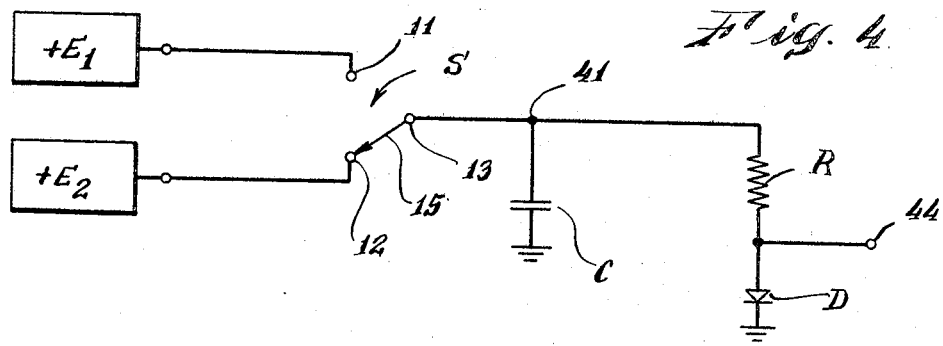
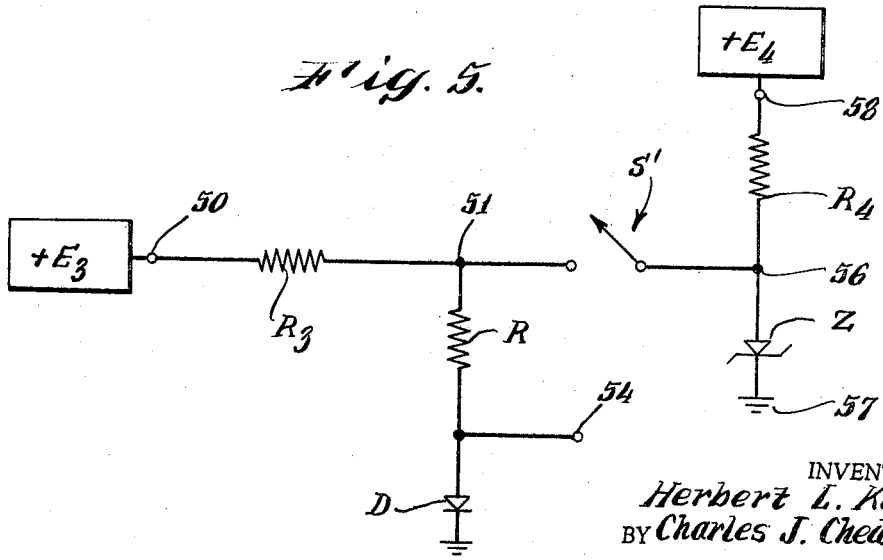
INVENTORS.
Herbert L. Kahn
BY Charles J. Chedester
Daniel N. Levinson
ATTORNEY.

United States Patent Office 3,482,115
Patented Dec. 2, 1969

3,482,115
CIRCUITS FOR MEASURING THE LOGARITHM OF THE RATIO OF TWO QUANTITIES
Herbert L. Kahn, Westport, and Charles J. Chedester, Darien, Conn., assignors to The Perkin-Elmer Corporation, Norwalk, Conn., a corporation of New York
Filed Feb. 25, 1966, Ser. No. 530,231
Int. Cl. G06g 7/20, 7/12
U.S. Cl. 307—229    8 Claims

ABSTRACT OF THE DISCLOSURE

This circuit utilizes a diode to obtain directly the logarithm of the ratio of the amplitudes of two voltages. These two voltages may represent two unknown or variable quantities (e.g., the so-called "reference" and "sample" transmittance detector outputs in a double-beam spectrophotometer) or a single unknown variable and a fixed reference voltage (e.g., the detected "sample" transmittance signal and a fixed standard voltage in a single-beam spectrometer), yielding the logarithm of their ratio (the "absorbance" of the sample). The measurment is accomplished by switching the two voltages across the same diode, thereby minimizing the adverse effects of variable errors (e.g., the temperature sensitivity of a silicon diode, for example). Techniques for minimizing adverse effects in the output caused by switching transients, and techniques for biasing the diode so as to "linearize" the diode (i.e., make the voltage output directly proportional to the logarithm of its input) over the range actually utilized are also disclosed.

---

This invention relates to a circuit for determining the logarithm of a variable relative to a base value, or for determining the logarithm of the ratio of two quantities. Such a device is useful because the logarithm of a single quantity or the logarithm of the ratio of two quantities may either be the technically significant value to be measured or else these logarithm values may be the most convenient form in which to present measured data.

One of the fields of use for such a logarithm circuit is absorption spectrophotometry. In a single beam absorption spectrophotometer a beam of radiation of known original flux intensity, $F_0$, is passed through a sample substance and the relative intensity $F_T$ of the transmitted beam on the other side is measured (usually expressed as a fraction of the original intensity, i.e., $F_T/F_0 = T$). It is well known that the reciprocal of this relative intensity or transmittance (i.e., $1/T$) varies linearly as the antilogarithm of the thickness or concentration of the sample. Usually it is the concentration of the sample which is the unknown quantity, and this may be determined directly from the logarithm of the reciprocal of the transmittance (i.e, log $(1/T)$); this is, of course, identical to the negative logarithm of the transmittance (i.e., $$\log \left(\frac{1}{T}\right) = -\log T)$$

This is usually called the "absorbance." In such single beam absorption spectrophotometers it is therefore desirable to convert the measured transmittance (i.e., the relative output of a photosensitive device) to the negative logarithm of the transmittance.

A double beam spectrophotometer utilizes two separate paths of equal radiation from a source, only one of which passes through the sample. Assuming that these two beams are of the same original intensity and have passed through identical optical paths (except of course for the presence of the sample in one), the ratio of their final intensities (i.e., F sample/F reference) is a direct measure of the transmittance of the sample, regardless of the original (unknown but equal) intensity of the beams. Thus in a double beam instrument it is the logarithm of the ratio of the so-called reference beam intensity to the sample beam intensity (i.e., log $F_R/F_S$) which is proportional to the concentration (or thickness) of the sample.

The hereinafter more fully described embodiments of the invention are capable of measuring the logarithm of a single variable (referred to a standard base line), or of measuring the logarithm of the ratio of two quantities. Although particularly useful in an absorption spectrophotometer, as pointed out above, the invention is of course not limited to such use, but may be utilized wherever such a logarithmic conversion is desired in any type of instrument having an electrical signal which represents a mathematical quantity.

The preferred illustrative embodiments, hereinafter more fully described, are particularly advantageous in that they utilize very simple and inexpensive components, but nevertheless allow a relatively precise conversion to a logarithm over a moderately large range of values. In addition the simple circuit is quite versatile in that its output may be made to cover a full scale (by so-called scale expansion) by simply changing the gain of the voltmeter reading the output. For example, if a conventional millivoltmeter is connected to the output of the circuit, the meter scale can be made to give linear readings over exactly one decade. By merely changing the gain of the meter, the meter scale may be made to correspond to, for example, two decades, one tenth of a decade, or any other reasonable range. When the device is utilized to drive a servosystem, no automatic gain control is ordinarily required. In conventional servosystems producing a logarithmic output, automatic gain control is usually needed to keep the loop tight at higher values and prevent it from oscillating at low values. Finally the circuit allows long time constants to be utilized, so as to effect a high degree of noise suppression. In logarithmic servosystems, loop stability considerations often limit the length of the time constants which can be utilized, so that short term fluctuations (i.e., noise) cannot be readily eliminated. The inventive circuit, however, allows the insertion of relatively long time constants at its output and before the meter or readout servosystem, thereby suppressing noise to almost any practically possible degree.

An object of the invention, therefore, includes the provision of a very simple circuit for producing a logarithm of either a single variable or of a ratio of two quantities, which utilizes inexpensive, easily obtained simple components.

Other objects of the invention include provision of such a simple logarithmic output circuit, which is capable of utilizing continuously variable scale expansion, long time constants for noise suppression, and which requires no automatic gain control for stability.

Other fetaures and advantages of the invention will be apparent to one skilled in the art upon reading the following specification in conjunction with the accompanying drawings, in which:

FIGURE 3c is a similar schematic showing how the circuit of FIGURE 4 minimizes the spikes shown in FIGURE 3b;

FIGURE 4 is a schematic of the circuit corresponding to FIGURE 1 but with the addition of means for suppressing the spikes shown in FIGURE 3b; and FIGURE 5 is a schematic diagram of the circuit for determining the logarithm of a single quantity, incorporating means for eliminating the spikes introduced by the previous technique of switching.

Figure 1:
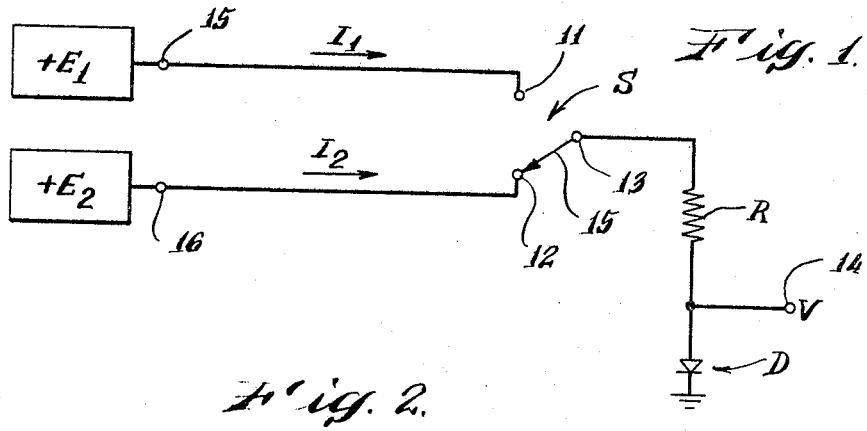
FIGURE 1 is a schematic diagram of one circuit according to the invention for yielding (as an A.C. output voltage) a measure of the logarithm of the ratio of two input quantities (which are represented by input D.C. voltages)

Before the various embodiments shown in the drawing are described, a description of the properties of the most important element in the various circuits will first be given. This element is a diode of the solid state type, for example, of silicon. It is well known (see for example Dewitt and Rosoff, Transistor Electronics (McGraw-Hill Book Company, Inc., New York, 1957), pages 60–65, Equations 2–6) that such diodes when run at low forward currents (i.e., less than 100 microamperes) will obey the following current equation:

$$I = I_s \left( e^{\frac{qV}{kT}} - 1 \right) \quad (1)$$

where:

$I$ = diode forward current,
$I_s$ = diode reverse current,
$T$ = junction temperature in ° K,
$k$ = Boltzmann's constant,
$q$ = charge of an electron in coulombs,
$q/k \approx 12{,}000$, and
$V$ = forward voltage across diode.

Rearrangement of terms gives:

$$\frac{I + I_s}{I_s} = e^{\frac{qV}{kT}} \quad (1a)$$

Taking the logarithm of both sides, gives:

$$\frac{kT}{q} \log \left( \frac{I + I_s}{I_s} \right) = V \quad (1b)$$

If at two different times, first, a current equal to $I_1$ flows through the diode, and, then, a current equal to $I_2$ flows therethrough, the difference in the diode voltages ($V_1$ and $V_2$ respectively) due to the two different currents will be given by:

$$V_1 - V_2 = \frac{kT}{q} \left( \log \left( \frac{I_1 + I_s}{I_s} \right) - \log \left( \frac{I_2 + I_s}{I_s} \right) \right)$$

which may be rewriten as:

$$V_1 - V_2 = \frac{kT}{q} \log \left( \frac{I_1 + I_s}{I_2 + I_s} \right) \quad (2)$$

Before investigating the mathematical relationship given by Equation 2 just above, we shall look at the first embodiment which utilizes this invention. In FIGURE 1 the diode D is shown as being grounded at one side (namely, at its cathode) with the other side (its anode) being connected through a relatively large resistor R to a switch S. This switch is of the double throw, single pole type so as to alternately connect terminal 13 with either of terminals 11 or 12. To terminal 11 is connected a positive source of potential $E_1$, which will therefore supply a current $I_1$ through resistor R and diode D when switch S connects terminal 11 to terminal 13. Similarly, a source of voltage $E_2$ is connected to terminal 12 so as to supply a current $I_2$ through the resistor and diode when switch S is in the position shown in FIGURE 1.

As an example, let it be assumed that potential $E_1$ and potential $E_2$ are voltages representing the detector outputs from a double beam spectrophotometer. Thus these potentials represent the intensity of the light beam striking the detector for light that has passed through the sample, say, $E_2$, and light which has not passed through the sample, say, $E_1$ (i.e., so-called "sample radiation" and "reference radiation"). In order to determine "absorbance" of the sample, it is desired to know the logarithm of the ratio of these two signals. This version of the invention therefore has its output at terminal 14, which represents the voltage V across the diode at all times. Moving the switch arm back and forth between terminals 11 and 12 will therefore cause a voltage to be generated at terminal 14, which will have the alternate values of $V_1$ and $V_2$. From Equation 2 above, the difference between these two values (i.e., $V_1 - V_2$) will be a measure of the logarithm of the ratio of $E_1$ and $E_2$ only if:

$$\frac{E_1}{E_2} \approx \frac{I_1 + I_s}{I_2 + I_s} \quad (2a)$$

In FIGURE 1 we can see that the ratio $E_1/E_2$ is normally proportional to the ratio $I_1/I_2$ if the change in the resistance $R_D$ of the diode can be considered insignificant. It is obvious from the circuit of FIGURE 1 that the change of the diode resistance $R_D$ may be neglected if and only if the total resistance of the circuit is very large relative to the resistance of the diode. Thus one condition of the circuit is that the resistance R is very much larger than the diode resistance $R_D$ (so that even substantial percentage changes in $R_D$ causes relatively small change in the total resistance, $R + R_D$).

The ratio given in the right-hand member of Equation 2a will actually approximate the ratio of the input potentials ($E_1$ and $E_2$ respectively) only if the value of the reverse diode current $I_s$ is very small compared to the currents $I_1$ and $I_2$. Thus the second condition necessary in order to make the circuit of FIGURE 1 actually yield the desired logarithm of the ratio of $E_1$ and $E_2$ at terminal 14 is that the operating values of the two currents ($I_1$ and $I_2$) are large relative to the reverse diode current $I_s$.

Differentiating Equation 1 yields the change in diode current for small changes in diode voltage:

$$\frac{\partial I}{\partial V} = \frac{q}{kT} I_s e^{\frac{qV}{kT}} \quad (2b)$$

Substituting for the last term on the right-hand side of Equation 2b, the equivalent term given by Equation 1a, we have:

$$\frac{\partial I}{\partial V} = \frac{q}{kT} (I + I_s) \quad (2c)$$

If we substitute the value of 40 for the value of $q/kT$ for an absolute temperature of 300° K., we may invert Equation 2c and simplify it as follows, noting that $\partial V/\partial I$ is equal to $r_d$, the dynamic diode resistance (i.e., the change in diode resistance for small changes in input):

$$r_d = \frac{\partial V}{\partial I} = \frac{1}{40(I + I_s)} \quad (2d)$$

Since $I_s$ is extremely small compared to $I_1$ under operating conditions, we may write the close approximation:

$$r_d = \frac{\partial V}{\partial I} \approx \frac{1}{40I} \quad (2e)$$

In FIG. 1 when switch S connects terminal 11 to terminal 13, the current, voltage and resistances are obviously related (by Ohm's law) in the following manner:

$$I_1 = \frac{E_1}{R + R_D} \quad (3)$$

where $R_D$ is the total resistance of the diode.

The total resistance of the diode $R_D$ equals the sum of its static or lowest resistance $R_s$ plus its dynamic resistance $r_d$, thusly:

$$R_D = R_s + r_d \quad (3a)$$

Substituting this in Equation 3 above $$I_1 = \frac{E_1}{R+R_s+r_d} \quad (3b)$$

This equation may be simplified by grouping the two constant resistances (R and $R_s$) of the circuit together and defining them as the combined constant resistance $R_C$ (equal to $R+R_s$) thusly:

$$I_1 = \frac{E_1}{R_C+r_d} \quad (3c)$$

From Equations 3c and 2e, we may write:

$$I_1 = \frac{E_1}{R_C + \frac{1}{40I_1}} \quad (3d)$$

which may be rewritten as:

$$I_1 = \frac{40E_1 - 1}{40R_C} \quad (3e)$$

Obviously for the switch position in FIG. 1 in which terminal 12 is connected to terminal 13, the relationships will be similar to that in Equations 3 through 3e, except that the subscripts will be different (namely, $I_2$ will replace $I_1$, and $E_2$ replaces $E_1$). We may therefore write analogously to Equation 3e, but for the other switch position:

$$I_2 = \frac{40E_2 - 1}{40R_C} \quad (3f)$$

Dividing Equation 3e by Equation 3f and rearranging terms yields:

$$\frac{40E_1 - 1}{40E_2 - 1} = \frac{I_1}{I_2} \quad (3g)$$

Comparison of this Equation 3g with Equation 2a indicates that even if the reverse diode current, $I_s$, is negligibly small compared to the forward currents, $I_1$ and $I_2$, the left-hand term in Equation 3g has an error in both the numerator and denominator. For inputs ($E_1$ and $E_2$) of at least 2½ volts, both the numerator and denominator of the left-hand term in Equation 3g will differ from accurate proportionality by no more than 1%. In fact the percentage error in the entire left-hand term (being equal to the difference of the percentage errors of the numerator and denominator) will be much less than 1%. To operate at lower input voltages, a biasing voltage is preferably provided as will appear subsequently.

If Equation 3e and Equation 3f are substituted into Equation 2, we obtain the following:

$$V_1 - V_2 = \frac{kT}{q} \log \frac{40E_1 - 1 + 40R_C I_s}{40E_2 - 1 + 40R_C I_s} \quad (4)$$

In Equation 4 although $I_s$ is extremely small (i.e., minor fractions of a microampere), the resistance R (and therefore $R_C$, equal to $R+R_D$) should be very large (preferably, about one megohm) in practice for reasons already given. Therefore, the last terms in both the numerator and denominator of Equation 4 are not insignificant. For example, if the diode reverse current is on the order of .01 μa. and the resistance R (and therefore $R_C$) on the order of one megohm, the expression, 40 $R_C I_s$ will have values around:

$40 \times 10^6 \times 10^{-8} = 0.4$ volt. As partially noted previously, if both $E_1$ and $E_2$ are always relatively large (e.g., 2½ volts or more), the two undesired terms (namely, $$-1 + 40R_C I_s)$$

in both the numerator and denominator, therefore, will cause percentage errors of no more than 1% in the numerator and denominator. In fact since each of these terms has a different sign, they will tend to partially cancel. Further, the percentage errors in the numerator and denominator contributed thereby will be in the same sense, so that the percentage error in the entire fraction will be the difference of the percentage error of the numerator and denominator. For example, for the values of $R_C$ and $I_s$ already mentioned, Equation 4 yields:

$$V_1 - V_2 = \frac{40E_1 - 1 + 0.4}{40E_2 - 1 + 0.4} = \frac{40E_1 - 0.6}{40E_2 - 0.6}$$

If both $E_1$ and $E_2$ are at least about two volts, there will be only a fractional percentage error in the numerator and denominator; and the percentage error in the whole fraction will be the difference in these two fractional percentage errors (obviously, a smaller fraction).

From Equation 4 it may be noted that the differences in the measured voltage levels V (upon throwing switch S) would be exactly proportional to the logarithm of the ratio of the input potentials ($E_1$ and $E_2$), if $40R_C I_s$ equaled 1. This relationship does not, however, yield a useful technique for linearizing the circuit of FIGURE 1 for small values of $E_1$ and $E_2$, since $I_s$ is an extremely temperature dependent variable in, for example, silicon diodes. Therefore other techniques (in addition to using relatively large $E_1$ and $E_2$ values) of making the A.C. voltage measured at terminal 14 more nearly proportional to the logarithm of the ratio of the input potentials ($E_1$ and $E_2$) must be sought. Such a technique is illustrated in FIGURE 2.

Figure 2:
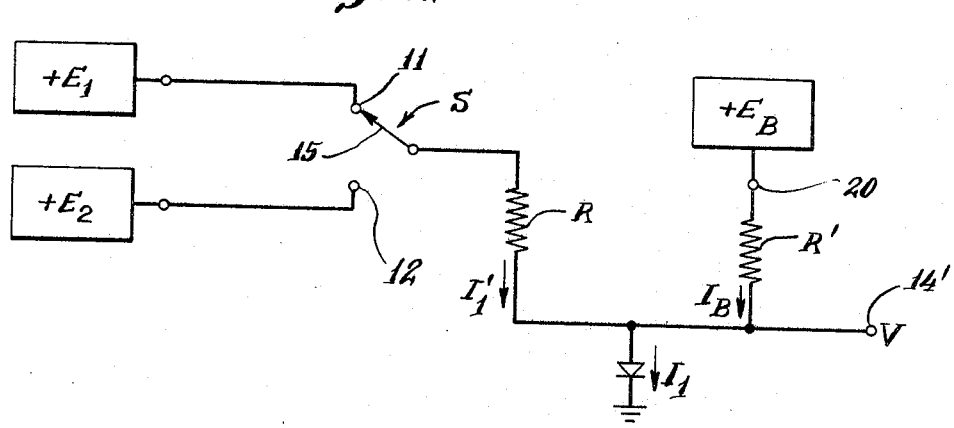
FIGURE 2 is a schematic of a circuit similar to FIGURE 1, but with the addition of a simple biasing circuit which tends to reduce deviation from the ideal logarithmic curve.

FIGURE 2 is based on the FIGURE 1 circuit, but differs therefrom in having an additional biasing circuit. Thus the circuit in FIGURE 2 is identical to that in FIGURE 1 except that it has in addition a biassing terminal 20, at which a positive biasing voltage $E_B$ is applied, and an additional resistance R' connected between bias terminal 20 and the anode of the diode. We shall assume that the biasing resistor R' is identical in every respect to the original resistor R; this will simplify the arithmetic which follows, but it is actually not necessary that these two resistors be equal in practice. It will be assumed that switch (S) is connected to the upper input terminal 11 (as shown) so that a current $I_1'$ is flowing through the main left-hand resistor R. In addition because of the biasing voltage $E_B$, an additional current $I_B$ will be flowing in the right-hand or bias leg of the circuit. If only an extremely small current is allowed to flow from output or measured terminal 14', the total current through the diode (represented by $I_1$) will be substantially equal to the sum of the two branch currents. We may therefore write:

$$I_1 = I_1' + I_B \quad (4a)$$

From Ohm's law, we get the following two relationships:

$$I_1' = \frac{E_1}{R+R_D+\frac{1}{40I'}} = \frac{E_1}{R_C+\frac{1}{40I'}} \quad (4b)$$

and $$I_B = \frac{E_B}{R'+R_D+\frac{1}{40I_1}} = \frac{E_B}{R+R_D+\frac{1}{40I_1}} = \frac{E_B}{R_C=\frac{1}{40I_1}} \quad (4c)$$

By substituting the right-hand terms of Equations 4b and 4c into Equation 4a, we obtain:

$$I_1 = \frac{E_1 + E_B}{R_C + \frac{1}{40I_1}} = \frac{40(E_1 + E_B) - 1}{40R_C} \quad (4d)$$

When the arm 15 of switch S in FIGURE 2 is thrown to the other position so as to connect terminal 12 to terminal 13, the other input voltage $E_2$ will then cause a current, $I_2'$, to flow through resistor R. The total current through the diode is designated $I_2$. Equations analogous to 4a, 4b and 4c, differing only in the value of the various numerical subscripts, may then be written, finally yielding the following equation (which is analogous to Equation 4d for the input voltage $E_2$):

$$I_2 = \frac{E_2 + E_B}{R_C + \frac{1}{40 I_2}} = \frac{40(E_2 + E_B) - 1}{40 R_C} \quad (4e)$$

Substituting these values for $I_1$ and $I_2$ in Equation 2 yields:

$$V_1 - V_2 = \frac{kT}{q} \log \frac{40(E_1 + E_B) - 1 + 40 R_C I_s}{40(E_2 + E_B) - 1 + 40 R_C I_s} \quad (5)$$

The above Equation 5 indicates that the middle term in the bracketed expression, namely −1, may be exactly balanced out by utilizing a relatively small biasing voltage, $E_B$. In particular $E_B$ would equal only $\frac{1}{40}$ of a volt (i.e., 25 millivolts). If, as previously indicated, the product $R_C I_s$ is small compared to the input voltage ($E_1$ and $E_2$), the FIGURE 2 circuit will yield at its computer output 14 voltages ($V_1$ and $V_2$) having a difference substantially equal to the logarithm of the ratio of the two input voltages ($E_1$ and $E_2$).

Equation 5 contains the same error term (namely, $40 R_C I_s$) in both th numerator and the denominator, and therefore behaves in an analogous manner to that described above with reference to Equation 4. The relative precision of the output values of the FIGURE 2 circuit may be better appreciated from the following suggested actual values for the various circuit parameters. It should be noted first that the contribution of $R_C I_s$ cannot be practically reduced to substantially zero by utilizing very small values for R. The reason for this is that at the resulting high currents, the ohmic resistance of the diode $R_D$ which is assumed negligible in the above discussions (i.e., $R_C$ is assumed to be substantially equal to R and R' alone), becomes significant. It has been determined empirically that a good compromise value for the resistances (R and R') is about one megohm.

One can obtain commercially diodes having a specified $I_s$ value of .001 μa, and such diodes actually maintain values of of $I_s$ below .01 μa. under all normal operating conditions. In order to maintain the error in the measurement quite low, the forward current in the diode should be maintained at at least about one μa. (see Equation 2). As may be seen from Equation 2, the error in the numerator and denominator of the logarithmic term will therefore be maintained below 1%. As previously explained, the error in the entire fraction will then necessarily be less than this. Assuming the value of one megohm for the input resistance R, the first two terms of Equation 3 indicate that the value of the input voltage $E_1$ should be maintained above one volt if the current is to be kept at at least one μa. Since it is relatively easy to produce linear outputs of up to 50 volts to serve as the inputs to the FIGURE 2 circuit, dynamic ranges of at least 50 to 1 are readily obtained. With careful choice of the various circuit constants (and of preselection of particularly good diodes), this dynamic range can be extended somewhat. In practice it has been found that the bias voltage $E_B$ is preferably several times larger than the value of $\frac{1}{40}$ given by the theoretical considerations above (see Equation 5).

As may be seen from Equation 5, the measured output from the diode is directly proportional to absolute temperature. For ambient temperatures near room temperature, the output voltage will therefore rise by approximately 0.3% for each degree C. of increased temperature. This temperature variation may be readily compensated by means of thermistor elements in various well-known ways. The output across the diode (i.e., the difference in output voltage at terminal 14 of the circuit in FIGURE 2 for the two positions of the input switch) is relatively small. For example, utilizing the circuit constants mentioned above, a ten-to-one ratio between $E_1$ and $E_2$ produces an output voltage (i.e., $V_1 - V_2$) of approximately 60 millivolts.

The relatively simple circuit of FIGURE 2 has many advantages, not the least of which is its relative simplicity and economy. Additionally the circuit is quite versatile in that any portion of its output (within the possible dynamic range) may be made to cover the full scale of the meter or other instrument used to measure its output at terminal 14. For example a voltmeter having a 60 millivolt full scale would read one decade in a linear manner. To change the range of the meter to two decades, 0.1 decade or even such values as 0.892 decade, it is only necessary to change the gain of an amplifier supplying the input to the meter (namely, by factors 1/2, 10, and 1/0.892, respectively).

The output of terminal 14 of the FIGURE 2 circuit is especially suitable for driving a servo system. Conventional servo systems incorporating means for obtaining a logarithmic output ordinarily must include some sort of automatic gain control, in order to keep the servo loop sufficiently tight at high values, and to prevent it from oscillating at low values. When the diode system of, for example, FIGURE 2 is utilized to obtain the logarithm of the ratio desired, the servo system (and of course the circuit of FIGURE 2 itself) require no automatic gain control. A further advantage of the FIGURE 2 circuit is the ability for the operator to choose as long a time constant as he may desire, in order to thereby increase the degree of noise suppression. In many circuits, loop stability considerations limit the length of the possible time constant which may be utilized. One may, however, insert as long a time constant as desired between the output 14 of the diode of FIGURE 2 and the servo or meter which is being fed thereby, without adversely affecting the stability thereof. Preferably this time constant may be made adjustable so that the operator may choose an appropriate one in use.

Figure 3A:
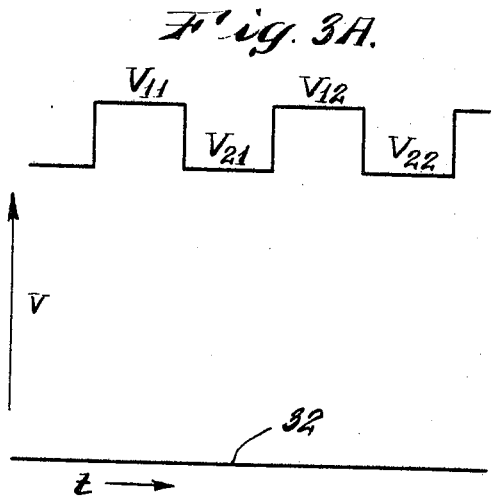
FIGURE 3a is a graphical schematic of the ideal output of either of the circuits of FIGURE 1 or FIGURE 2.
Figure 3B:
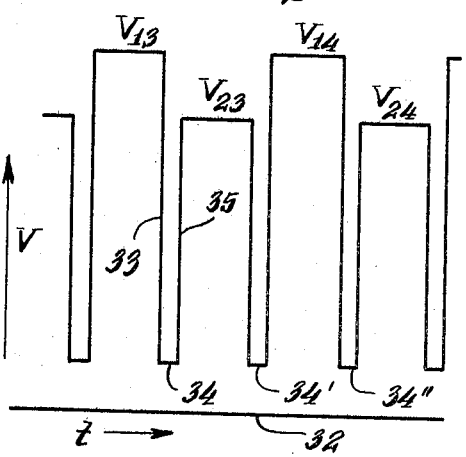
FIGURE 3b is a similar schematic, showing the discontinuities or spikes caused by the less than ideal switching.

In the discussion of both the FIGURE 1 and the improved FIGURE 2 circuits, it has so far been assumed that the switch S instantaneously switches from one position to the other. Obviously it is impossible to incorporate such a perfect switch into these circuits, and FIGURES 3a and 3b illustrate the desired and actual wave shapes at terminal 14 or 14' for an ideal and an actual switch, respectively. In FIGURE 3a the ideal output level from the voltage at terminal 14 or 14' is illustrated as a square wave voltage curve, shown generally at 30 at a level above the zero base line, represented at 32. When the switch S of either FIGURE 1 or 2 is connecting the higher input voltage (say, $E_1$) to input terminal 13, the output or measured voltage V will be at a level shown as $V_{11}$. If after being in this position (i.e., in contact with terminal 11) for a certain finite time, the switch were then instantaneously made to contact terminal 12, the output voltage at terminal 14 or 14' would then immediately drop (as shown at vertical portion 31) to the value $V_{21}$. If the switch could subsequently be instantaneously thrown back to terminal 11, the voltage $V_{12}$, corresponding to the then existing input voltage at $E_1$, would then appear at the output. Similarly returning the switch once more to terminal 12 instantaneously would cause the output immediately to assume the voltage value $V_{22}$. Thus the output would under such ideal conditions alternately assume the value corresponding to the existing values of $E_1$ and $E_2$ sequentially. The A.C. component of square wave 30 in FIGURE 3a would therefore yield the logarithm of the ratio of $E_1$ to $E_2$ in the manner given by Equation 5. Thus an A.C. meter could read directly the desired logarithm of the ratio of the input voltages. In other words, as may be seen from Equation 5, the difference in the voltage levels between $V_{11}$ and $V_{21}$, etc., is substantially directly proportional to the desired logarithm of the ratio of input voltages.

FIGURE 3b shows the actual output voltages if switch S has a finite travel time between terminals 11 and 12.

Assuming the switch were at terminal 11, the voltage value at $V_{13}$ would be present at the output. However, as soon as the switch arm 15 left contact terminal 11, the voltage at both the input and the output would fall substantially to zero, as represented by the sharp almost vertical drop 33 in the output to the zero level 34. When the switch arm 15 reached terminal 12, the output voltage would sharply rise from level 34, as indicated by substantially vertical portion 35, to the value $V_{23}$ (corresponding to input voltage $E_2$). Between each movement of switch arm 15 back and forth between terminals 11 and 12, the output voltage at terminal 14 and 14' would therefore fall to a value of essentially zero, represented by levels 34, 34', 34'', etc., in FIGURE 3b. A meter (or other readout device) responding to the A.C. components of the signal shown in FIGURE 3b would indicate primarily the actual values of voltage levels, $V_{13}$, $V_{23}$, $V_{14}$, $V_{24}$, etc., with reference to the open switch values 34, 34', 34'', etc. In other words, the sharp changes in voltage represented by the substantially vertical lines 33, 35, etc., would be the predominant component of the A.C. signal output. In order to avoid this obscuring of the desired difference in the signal levels of $V_{13}$ and $V_{23}$, etc., the circuit of FIGURE 1 should be modified, for example, as shown in FIGURE 4. Obviously the preferred circuit of FIGURE 2 may be modified in an analogous manner.

FIGURE 4 is identical to FIGURE 1 except for the addition of input capacitor C which shunts point 41, adjacent terminal 13, to ground as shown at 43. This capacitor C therefore introduces a time constant in the input of the circuit so as to yield an output having the general appearance as shown in FIGURE 3c. Specifically the output of terminal 44 in FIGURE 4 will be at a value $V_{13}'$ when switch S connects terminal 11 to terminal 13. This value will correspond to $V_{13}$ in FIGURE 3b. However, when the switch arm 15 in FIGURE 4 moves from terminal 11 to terminal 12, the charge on capacitor C will maintain a slowly decaying potential at point 41 so as to maintain the output at terminal 44 at a value near $V_{13}'$ in FIGURE 3c. The slow decay of the voltage at the upper end of capacitor C will cause the voltage at output terminal 44 to start declining as indicated by portion 42 in FIGURE 3c. However, this decline will occur for only a very short time before switch arm 15 will reach terminal 12, thereby impressing the voltage of input source $E_2$ on terminal 13. When switch arm 15 reaches terminal 12, the output voltage at terminal 44 will be relatively rapidly adjusted to the value corresponding to the input voltage $E_2$, as indicated by portion 43 in FIGURE 3c. After switch arm 15 has stayed on terminal 12 for its allotted time, this arm will leave contact 12, thereby opening the input to the circuit of FIGURE 4. However, condenser C will again maintain the value of the input voltage near the last value (namely, that of $E_2$) so as to maintain the voltage at output terminal 44 near the level of $V_{23}'$; this is indicated by sloping portion 45 in FIGURE 3c. When switch arm 15 has again reached terminal 11, the input voltage will start to assume that of input source $E_1$ so that the output voltage at terminal 44 will rise (as indicaed by portion 46 in FIGURE 3c) to the value $V_{14}'$. The input condenser C therefore will cause the output voltage (and more especially its A.C. components) to approximate the ideal square wave form 30 shown in FIGURE 3a. Thus an A.C. meter receiving the acutal output at terminal 44, as shown in FIGURE 3c, will indicate essentially the difference in voltage levels between the horizontal portions of the curve (namely, the difference between levels $V_{13}'$ and $V_{23}'$, etc.).

In order to avoid problems of cross talk, it is necessary to utilize relatively low impedance sources at $E_1$ and $E_2$ in both FIGURE 4 and in the corresponding modification (not shown) of FIGURE 2. This may be readily accomplished by utilizing any conventional means, such as cathode followers in the last stage of the amplifier supplying the input voltages to the FIGURE 4 circuit or the correspondingly modified FIGURE 2 circuit. Obviously it is preferable to utilize a relatively fast acting switch at S even when the capacitor C is utilized in the manner illustrated in FIGURE 4. Such a fast switch allows the capacitor C to have relatively moderate values, thereby avoiding any substantial effect on the relatively flat levels ($V_{13}'$, $V_{23}'$, $V_{14}'$, $V_{24}'$, etc.). Specifically, the capacitor will have a tendency to hold the input level of the circuit to a value between the two levels for a short time even after the switch arm 15 has made contact with one of the terminals. As just stated, however, this effect may be readily minimized if relatively rapid switching is utilized, allowing capacitor C to have only moderate values.

FIGURE 5 shows a somewhat different version of the device, which is particularly useful for determining the value of a single variable. In the center of the figure is the same diode D having the same current limiting resistance R as in the previous circuits. The output is, of course, taken at the same point relative to the diode, namely, at terminal 54 (which corresponds to outputs 14, 14' and 44 of the previously described circuits). The input terminal 50 will be supplied with the variable voltage $E_3$ which represents the function to be measured. For example, $E_3$ may be the amplified voltage from a photosensitive detector (as used, for example, in a single beam spectrophotometer). In such applications it is desired to obtain the logarithm of the quantity representing how the input $E_3$ varies relative to a standard or base value. For example, in a single beam absorption spectrophotometer wherein $E_3$ represents the intensity of the light after it has passed through the sample, it is desired to know how this intensity varies from the intensity which would be obtained for a completely nonabsorbing sample. In other words, if the detector would produce an amplified output voltage of, say, $E_0$ for a completely nonabsorbing sample, then the quantity desired is the logarithm of $E_0/E_3$, since this logarithmic quantity would be at least proportional to the desired absorbance of the sample.

Preferably the input voltage $E_3$ (which may be a direct measure of the transmittance, as mentioned above) has already been amplified to a relatively high level and is then fed across a relatively high resistance $R_3$ to the junction point 51. The reason for including the high resistance $R_3$ will become apparent hereinafter. Also optionally connected to this junction point 51, through switch S', is a low impedance source of constant voltage, such as the potentiometer shown at the right in FIGURE 5. This potentiometer includes the source of reference voltage $E_4$, a relatively small (as compared to $R_3$) resistance $R_4$, and the Zener Z semiconductor Z. Since the lower end of the Zener Z is grounded as shown at 57, point 56 will be at the rated Zener voltage value if the voltage applied at reference terminal 58 and the resistance $R_4$ are chosen so that the current through the Zener is within its rated range. For example, if resistance $R_4$ is, say 20,000 ohms and the reference source voltage $E_4$ is a low impedance, say 250 volt source, the normal current through the Zener will be well within the range of, say, from 5 to 100 milliamperes (which is a typical operating range of commercially available Zeners). Because of the well-known characteristic of a Zener, the voltage at 56 will be maintained at the rated Zener voltage (for example, 10 volts) even if the low impedance D.C. source of $E_4$ fluctuates about its desired value.

Closing of switch S' will have the effect of transferring the maintained or regulated voltage (determined by the Zener) at point 56 to point 51, regardless of the value of the variable input voltage $E_3$. The reason for this is as follows. Since the input or isolating resistor $R_3$ has a very great resistance value (for example, one megohm), closing switch S' will cause only a small additional current to flow through the Zener (because of the voltage contributed by source $E_3$). This additional small current, when added to (or subtracted from) the current contributed by reference source $E_4$ through resistor R$_4$, will not cause the current through the Zener to depart from its rated range, and the voltage at point 56 will thus remain at the rated Zener voltage (e.g., still 10 volts). Therefore the voltage at point 51 will be determined substantially solely by the rated voltage of the Zener when switch S' is closed.

When switch S' is open, the voltage at point 51 will of course be determined solely by the variable voltage at E$_3$. The circuit of FIGURE 5 therefore allows the alternate presentation to the input at 51 to the logarithmic diode circuit of a standard fixed reference voltage (the Zener voltage) and the variable measured voltage (at E$_3$), without introducing any spike or transient effect. The output at 54 will therefore be like FIGURE 3a, rather than FIGURE 3b. This is true since there will be no time at which the voltage at point 51 is not determined by the variable voltage at E$_3$ (switch S' open) or the Zener voltage (switch S' closed).

The illustrated reference voltage of the circuit at the right in FIGURE 5 (utilizing a low impedance but not very highly regulated fixed voltage E$_4$, the resistance R$_4$, and the Zener Z) is merely a preferred way for supplying the reference voltage (E$_0$) at point 51 in the circuit. Another similar means for supplying this reference voltage upon the closing of switch S' would be to substitute for the Zener Z in FIGURE 5 a resistor having a resistance value very much lower than the value of the resistance R$_3$. For example, such a substitute resistance may be on the order of 1,000 ohms when resistor R$_3$ is one megohm (the resistance R$_4$ and the voltage of source E$_4$ being chosen so as to present at point 56 the desired reference voltage). In such a modified circuit, closing switch S' will have the effect of shunting substantially all of the voltage appearing at input E$_3$ through the low resistance to ground at point 57. Therefore the voltage at point 51 would again be substantially solely determined (when the switch S' is closed) by the elements to the right of this switch. For example, if the resistance replacing the Zener in FIGURE 5 were 1,000 ohms, the resistor R$_4$ were 24,000 ohms and the reference voltage E$_4$ were 250 volts, 10 volts would appear at point 56 and would be transferred to point 51 upon the closing of switch S'. Since the input resistnce R$_3$ would be 1,000 times as large as the resistance substituted for the Zener in FIGURE 5, substantially the entire contribution to the voltage at point 51 caused by input source E$_3$ would be shunted to ground. The only practical disadvantage of such a conventional potentiometer in place of the resistor R$_4$ and the Zener Z in FIGURE 5 is that in such case the low impedance reference voltage E$_4$ must be relatively highly regulated, the Zener in FIGURE 5 automatically regulating the voltage in the right-hand part of the circuit as above noted.

Regardless of the type of low impedance reference voltage source utilized, circuits of the type illustrated in FIGURE 5 have the above-noted advantage of inherently eliminating the open switch problems of the FIGURE 1 and FIGURE 2 type of circuits. The FIGURE 5 type of circuit is especially adapted to measure the logarithm of the ratio of a variable voltage relative to a fixed reference level. Specifically the output at 54 will be proportional to the logarithm of $E_3/E_0$ (in which E$_0$ is the rated Zener voltage in FIGURE 5 or some fixed fraction of the voltage source E$_4$ in a straight convention potentiometer version). It is at least theoretically possible to utilize the FIGURE 5 type of circuit in a manner analogous to that suggested for the other embodiments (FIGURES 1, 2 and 4) to measure the logarithm of the ratio of two variable voltages (as supplied at E$_3$ and E$_4$ to the terminals 50 and 58 respectively). However, the utilization of circuits of the FIGURE 5 type for such measurements of two variables presents substantial practical difficulties.

The FIGURE 5 circuit cannot be utilized to measure the ratio of two variable inputs in the form illustrated, since the Zener will smooth out all variations of the voltage contributed by source E$_4$ (within the rated range of current of the Zener). Unfortunately the presence of the Zener is not the only difficulty in adapting the FIGURE 5 type of circuit to two variable measurements. The primary difficulty is the fact that the right-hand part of the circuit must be at a very low effective impedance relative to the left-hand part in order to cause the effect of the voltage at source E$_3$ to be substantially eliminated at point 51 (i.e., shunted) when switch S' is closed. Under such circumstances source E$_4$ must be a highly stable, low impedance variable voltage, which is very difficult to obtain in practice. In addition to this primary difficulty of obtaining a low impedance, precise variable voltage at E$_4$, there is the additional practical problem that the two original voltages to be compared must necessarily come from quite different circuits if they are to be introduced (at E$_3$ and E$_4$) as a high impedance and a low impedance source, respectively. For this reason it is extremely difficult in practice to maintain the two input voltages precisely proportional in the same way to the physical quantities they represent. For example, in a double beam spectrophotometer, the photodetector signal representing the reference beam intensity, in order to be introduced as a low impedance voltage at E$_4$, would necessarily go through a different circuit than the photodetector signal representing the same beam intensity (which would be introduced as a high impedance voltage at E$_3$). Because the two signals would therefore go through different D.C. circuits, the relative precision in the measurements would be reduced (D.C. circuits being notoriously subject to drift and other time-dependent inconsistencies).

For the above reasons, the FIGURE 5 type of circuit is preferably utilized only to compare a single variable voltage signal to a fixed reference level; and the FIGURE 4 form and the FIGURE 2 embodiment (incorporating if necessary a shunting capacitor of the type shown in FIGURE 4) is more practical for determining the ratio of two variable voltage signals. In most double beam measurements the two variable voltages to be compared normally come from substantially identical electrical circuits (e.g., amplifiers) having therefore both the same impedances and relative gains. Indeed in some applications of the various embodiments of the invention, the two input signals represented by E$_1$ and E$_2$ (in FIGURES 1, 2 and 4) will be output voltages at different times from the same circuit element. For example, in spectrophotometers which use optical time sharing, a single detector and a single amplifier may provide alternate signals representing the intensity of the light after passage through the sample and the intensity of light after passage through a similar optical path not including the sample. In such an environment, the E$_1$ and E$_2$ signals will be the output of the same detector amplifier at different times, thereby obviating the necessity for terminals 11 and 12 and switch S. When utilizing such time share detection techniques, the output of the detector amplifier may be directly connected to terminal 13 of the various circuits. Since the output of such a detector will inherently have a substantially square wave shape, the output V of the various circuits will have the characteristic shape graphically shown in FIGURE 3a without any input switching. Any undesirable transients in the input (caused, for example, by the optical switching) may be suppressed in the same manner as illustrated in FIGURE 4 by the use of a shunting capacitor C.

In the specific embodiments shown and described, it has been assumed that the various D.C. input voltages have been positive with respect to ground; and the polarity of the diode has therefore been shown and described accordingly. Obviously for negative input voltages, the diode would be reversed in polarity (this being the only change necessary to adapt the illustrated circuits to negative input voltages). It is possible to substitute for the preferred electrical element (a diode) other logarithmic elements, for example, a transistor. In such case, the base and emitter would correspond to the two electrodes of the diodes shown, but the output would be taken from the collector of the transistor. Although the use of a transistor has the inherent advantage of providing a voltage gain (the output from the diode versions being relatively low as previously noted even for quite large input voltages), the additional problem of variation of gain and the more complex effects on the transistor characteristics of variable environmental factors make the simpler diode more practical for most purposes.

The invention provides means for obtaining either the logarithm of the ratio between two input signals (i.e., the difference in their logarithms) or the logarithm of the ratio of a single variable relative to a reference or base voltage (i.e., the difference between the logarithms of a single variable voltage and the base voltage level). By utilizing two voltage input signals, both of which are alternately applied across the same diode, most of the inherent distortions from the desired logarithmic function caused by the diode are either eliminated or greatly reduced. Thus as may be seen in Equation 1b, the output voltage for a single input does not vary as the logarithm of the current I (which may be made substantially proportional to the input voltage E), but rather varies as the logarithm of the term $$\frac{I+I_s}{I_s}$$

Even where $I_s$ is extremely small compared to I, such a single input circuit nevertheless yields an output V which varies appreciably with changes in $I_s$ (since it appears in the denominator of the fraction as well as an additive term in the numerator). Therefore different diodes and variations in environment (e.g., temperature) will both cause quite inconsistent results for a single input logarithmic converter, exemplified by Equation 1b. By utilizing a comparison or difference measurement, the invention inherently measures the logarithm of the quantity $$\frac{I_1+I_s}{I_2+I_s}$$

as may be seen by Equation 2. It is obvious from the expression that the value of this fraction (and therefore its logarithm) is relatively invariable with changes in $I_s$ if both $I_1$ and $I_2$ are large relative thereto. For example, if I in Equation 1b is one miroamp, and $I_s$ varies from $\frac{1}{1000}$ to $\frac{2}{1000}$ microamps, the value of the friction $$\frac{I+I_s}{I_s}$$

will change by approximately 50%. On the other hand, if $I_1$ in Equation 2 is one microamp, and $I_s$ varies in the same manner just mentioned, the value of the numerator of the fraction in Equation 2 will change by only about $\frac{1}{10}$ of 1%. The denominator would also vary in a similar manner if $I_2$ is on the order of one microamp ($I_s$ still changing in the above manner). In a special case of $I_1$ and $I_2$ being essentially equal, the errors in the numerator and denominator will substantially completely cancel; while in the general case the error in the fraction will be at least somewhat smaller than the larger of the two errors. It is thus quite obvious that the primary technique of the invention, of utilizing as the significant measured quantity the difference in the output V corresponding to two different input voltages E improves the accuracy of the logarithmic determination by an extremely large factor.

Other features include adaption of the technique to either measuring the logarithm of the ratio of two variables or of the logarithm of a single variable relative to a base or reference level; the suppression of switching transients in each type of circuit; and the greater linearization of the measurement by means of a biasing voltage at the output. Although only a few examples of how each of these features may be incorporated in the basic invention has been illustrated and described, it will be obvious to one skilled in the art to make minor modifications of or slightly different combinations of the disclosed circuits for achieving these various features. For this reason the invention is not limited to details of any one or more of the disclosed embodiments, but rather it is defined in the appended claims.

What is claimed is:

1. An electrical apparatus for yielding an output voltage signal which is at least substantially proportional to the logarithm of the ratio of a pair of input voltages, at least one of which is variable, comprising:

a semiconductive diode having an output voltage varying in accordance with the logarithm of a nearly linear function of the input current flowing through said diode over a relatively large amplitude range, said function including at least one term which changes according to a difficult-to-control condition of said diode, so that said function tends to vary from substantial linearity in an uncontrollable manner under different conditions;

a large input resistor having one end directly connected to one side of said diode, said resistor having a resistance value much greater than that of said diode;

switching means for alternately connecting to the other side of said large resistor a first variable input voltage and then a second input voltage, so that the current flow through both said resistor and said diode is alternately substantially proportional to said first and then to said second input voltage;

output means directly connected between said one end of said large resistor and said one side of said diode, said output therefore being alternately at a voltage which is at least substantially proportional to the logarithm of said nearly linear function of said first variable input voltage and then at a voltage at least substantially proportional in the same manner to the logarithm of the same function of said second input voltage;

whereby the difference in said alternate output voltages is substantially proportional to the logarithm of the ratio of said first variable input voltage to said second input voltage since any departure from linearity in said function relative to said first variable input voltage is at least substantially compensated by a similar departure from linearity in the same function relative to said second input voltage.

2. An electrical apparatus according to claim 1, in which:
said semiconductive diode is composed primarily of silicon.

3. An electrical apparatus according to claim 1, in which:
blocking means are connected at the other side of said large input resistor for suppressing transients in the output of said diode resulting from any input transients caused by switching between the alternate presentation of said first and said second input voltages.

4. An electrical apparatus according to claim 3, in which:
said blocking means comprises a capacitor.

5. An electrical apparatus according to claim 1, in which:
each of said input voltages are substantially invariable during each individual period that said switching means connects each said input voltage to said large input resistor,
whereby each of said alternate outputs are D.C. voltages, the difference between which may be readily directly measured.

6. An electrical apparatus according to claim 1, in which:

voltage biasing means are directly connected to said output means for supplying a voltage for at least partially compensating for the nonlinearity of said function, whereby the useful dynamic range of said electrical apparatus is extended.

7. An electrical apparatus according to claim 1, especially adapted to measure the logarithm of the ratio of two variable input voltages, in which:

said switching means comprises a two-position switch for alternately connecting a source of a first variable input voltage and then a similar source of a second variable input voltage and then a similar source of a second variable input voltage to said other side of said large resistor.

8. An electrical apparatus according to claim 1, especially adapted to measure the manner in which a first variable input voltage changes relative to a constant reference level voltage, in which:

a high impedance source of said first variable input voltage is directly connected to said other side of said large resistor;

a low impedance constant voltage source is operatively connected to said switching means;

opening of said switch causing only said high impedance source of said first variable voltage to be connected to said one side of said diode through said large input resistor;

closing of said switching means connecting said low impedance constant voltage source to said other side of said large resistor, and simultaneously providing substantial shunting of said high impedance source of said first variable voltage;

whereby alternately opening and closing of said switching means causes said output voltage to attain two values, the difference between which is directly proportional to the logarithm of the ratio of said first variable input voltage and said constant reference level voltage.

References Cited
UNITED STATES PATENTS

| | | | |
|---|---|---|---|
| 2,916,702 | 12/1959 | Bigelow | 328—145 X |
| 3,058,057 | 10/1962 | Rost | 328—145 X |

DONALD D. FORRER, Primary Examiner

U.S. Cl. X.R.

328—145